US 8,959,431 B2

(12) United States Patent
Bunker et al.

(10) Patent No.: US 8,959,431 B2
(45) Date of Patent: Feb. 17, 2015

(54) LOW RESOLUTION PLACEHOLDER CONTENT FOR DOCUMENT NAVIGATION

(75) Inventors: Benjamin J. Bunker, Maple Valley, WA (US); Andrew Himberger, Woodinville, WA (US); Michael I. Borysenko, Redmond, WA (US); Peter Frem, Redmond, WA (US); Daniel Perkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/350,838

(22) Filed: Jan. 16, 2012

(65) Prior Publication Data
US 2013/0185633 A1 Jul. 18, 2013

(51) Int. Cl.
*G06F 17/00* (2006.01)

(52) U.S. Cl.
USPC .......................................................... 715/246

(58) Field of Classification Search
CPC ............... G06F 17/211; G06F 17/212; G06F 17/30424; G06F 17/30581; G06F 17/30964
USPC .................. 715/246, 247, 249, 253, 241, 271
See application file for complete search history.

(56) References Cited

U.S. PATENT DOCUMENTS

| | | | | |
|---|---|---|---|---|
| 6,101,512 | A * | 8/2000 | DeRose et al. | 715/234 |
| 6,311,215 | B1 * | 10/2001 | Bakshi et al. | 709/221 |
| 6,993,662 | B2 * | 1/2006 | Rubin et al. | 715/272 |
| 7,222,306 | B2 * | 5/2007 | Kaasila et al. | 715/801 |
| 8,032,482 | B2 | 10/2011 | Rosenberg et al. | |
| 8,244,889 | B1 * | 8/2012 | Ogdon et al. | 709/229 |
| 8,245,137 | B2 * | 8/2012 | Jones et al. | 715/272 |
| 8,438,495 | B1 * | 5/2013 | Gilra et al. | 715/781 |
| 2002/0029242 | A1 * | 3/2002 | Seto | 709/203 |
| 2002/0158908 | A1 * | 10/2002 | Vaajala et al. | 345/767 |
| 2002/0190990 | A1 | 12/2002 | Liu | |
| 2004/0113930 | A1 * | 6/2004 | Hawley et al. | 345/700 |
| 2004/0225960 | A1 * | 11/2004 | Parikh et al. | 715/517 |
| 2005/0097444 | A1 | 5/2005 | Ivarsey et al. | |

(Continued)

OTHER PUBLICATIONS

"Optimizing Data Caching for iPhone Application Responsiveness", Retrieved at <<http://www.slideshare.net/360conferences/optimizing-data-caching-for-iphone-application-responsiveness>> Retrieved Date: Nov. 16, 2011.

(Continued)

*Primary Examiner* — Laurie Ries
(74) *Attorney, Agent, or Firm* — Jessica Meyers; Jim Ross; Micky Minhas

(57) ABSTRACT

Architecture generates low resolution placeholder content that preserves the usefulness of application responsiveness by preserving and displaying the structure of the content. This facilitates decreased memory requirements associated with pre-rendering structurally-intact content. The architecture enables the storing of pre-rendered content at a lower zoom level than is intended for actual display to require fewer resources, pre-rendering content at a lower zoom level to allow the application to adjust for the lower zoom level to provide more structural integrity than would be achieved rendering at full display zoom level and compressing the resulting data, stretching the pre-rendered content to the zoom level that is intended for display in order to achieve a low resolution appearance that merges directly with the full resolution content, and transitioning between low resolution content and full resolution content when the full resolution content becomes available.

20 Claims, 7 Drawing Sheets

(56) References Cited

U.S. PATENT DOCUMENTS

| | | | |
|---|---|---|---|
| 2005/0206657 A1* | 9/2005 | Arcas | 345/660 |
| 2005/0216836 A1* | 9/2005 | Duke et al. | 715/531 |
| 2006/0069989 A1 | 3/2006 | Jones et al. | |
| 2006/0114490 A1 | 6/2006 | Rolleston | |
| 2006/0136552 A1 | 6/2006 | Krane et al. | |
| 2006/0150075 A1* | 7/2006 | Dietl et al. | 715/501.1 |
| 2007/0112857 A1* | 5/2007 | Guedalia | 707/104.1 |
| 2007/0157083 A1 | 7/2007 | Roy et al. | |
| 2008/0077852 A1* | 3/2008 | Fleishman et al. | 715/234 |
| 2008/0120129 A1* | 5/2008 | Seubert et al. | 705/1 |
| 2008/0181498 A1* | 7/2008 | Swenson et al. | 382/173 |
| 2009/0076899 A1* | 3/2009 | Gbodimowo | 705/14 |
| 2010/0153836 A1 | 6/2010 | Krassner et al. | |
| 2011/0035252 A1* | 2/2011 | Nielsen et al. | 705/9 |
| 2011/0050699 A1* | 3/2011 | Dawson et al. | 345/428 |
| 2011/0083191 A1* | 4/2011 | Pravetz et al. | 726/26 |
| 2011/0119615 A1* | 5/2011 | Cisler et al. | 715/772 |
| 2011/0304625 A1* | 12/2011 | Gerhard et al. | 345/428 |
| 2012/0226823 A1* | 9/2012 | Livnat et al. | 709/246 |
| 2012/0254804 A1* | 10/2012 | Sheha et al. | 715/834 |
| 2012/0254832 A1* | 10/2012 | Aman et al. | 717/109 |
| 2012/0304082 A1* | 11/2012 | Patten et al. | 715/760 |
| 2013/0346916 A1* | 12/2013 | Williamson et al. | 715/800 |

OTHER PUBLICATIONS

"For position only", Retrieved at <<http://en.wikipedia.org/wiki/For_position_only>>, Retrieved Date: Nov. 16, 2011.

"Getting Started with InDesign", Retrieved at <<http://teacherlink.ed.usu.edu/tlresources/training2/InDesign/InDesign%20Tutorial.pdf>>, Retrieved Date: Nov. 16, 2011.

"International Search Report", Mail Date: Apr. 30, 2013, Application No. PCT/US2013/021089, Filed date: Jan. 11, 2013, pp. 8.

* cited by examiner

*FIG. 2*

LOW RESOLUTION PLACEHOLDER CONTENT FOR DOCUMENT NAVIGATION

BACKGROUND

Application responsiveness during document navigation is generally limited to the raw speed with which the application can render content to keep up with user navigation. Responsiveness, then, tends to scale based on document complexity and performance characteristics of the machine hardware.

Some products have attempted to address the responsiveness problem by allowing the user to continue to navigate the document while the rendering of the content lags behind. While the application catches up, products show blank content or checkerboard-style patterns to indicate the content is not yet ready. The disadvantage of this scheme is that it greatly diminishes the usefulness of the responsiveness achieved, as the user is unable to see the content while navigating.

Other products have addressed the responsiveness problem by pre-rendering additional content that is not yet on the screen in order to lessen the likelihood that the user navigation is able to get ahead of application rendering. However, the additional resource requirements of keeping the pre-rendered content in memory limits the extent to which content can be pre-rendered and, therefore, the effectiveness of this scheme.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture generates low resolution placeholder content that preserves the usefulness of application responsiveness by preserving and displaying the structure of the content. This facilitates decreased memory requirements associated with pre-rendering structurally-intact content. Additionally, the architecture transitions between the low resolution placeholder content and full resolution content when the full resolution content becomes available.

More specifically, the architecture enables the storing of pre-rendered content at a lower zoom level than is intended for actual display to require fewer resources, pre-rendering content at a lower zoom level to allow the application to adjust for the lower zoom level to provide more structural integrity than would be achieved rendering at full display zoom level and compressing the resulting data, stretching the pre-rendered content to the zoom level that is intended for display in order to achieve a low resolution appearance that merges directly with the full resolution content, and transitioning between low resolution content and full resolution content when the full resolution content becomes available.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 2 illustrates a view of low resolution placeholder content merged with full resolution content in a text document of multiple pages.

DETAILED DESCRIPTION

Figure 1:
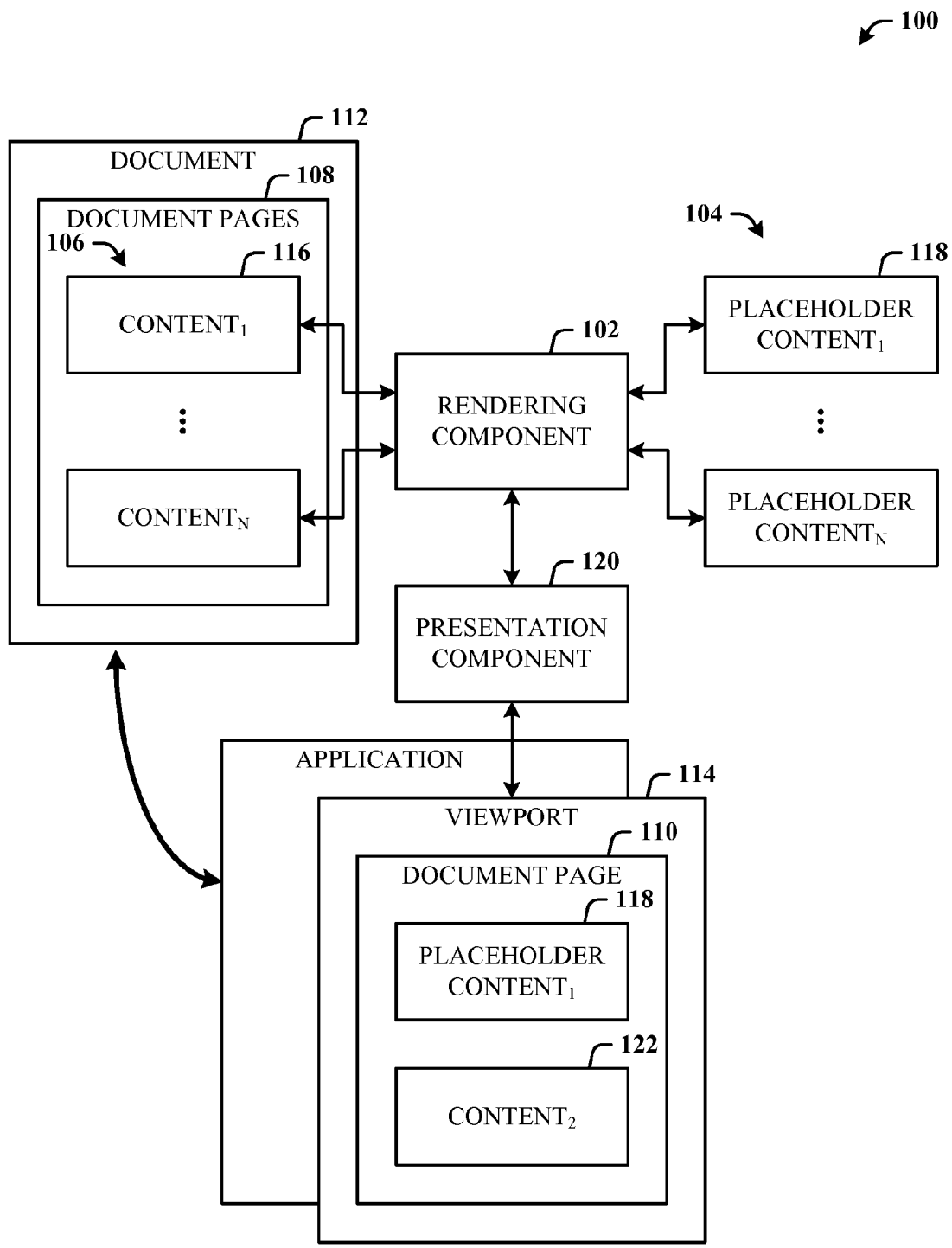
FIG. 1 illustrates a system in accordance with the disclosed architecture.

The disclosed architecture generates placeholder content for full resolution content in order to preserve the usefulness of application responsiveness by preserving and displaying the structure of the content. This facilitates decreased memory requirements associated with pre-rendering structurally intact content as well as enabling the storage and caching of pre-rendered content at a lower zoom level than is intended for actual display to require fewer resources. The architecture transitions from the low resolution placeholder content to the full resolution content in the document page, whether viewed or not, when the full resolution content becomes available. Note that the term "document" is intended to mean any type of application file that contains data, such as media in the form of text, images, video, and so on, and not specifically intended to be a word processing document. For example, the document can be a spreadsheet of a spreadsheet application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a rendering component 102 that renders placeholder content 104 from content 106 (finally or fully rendered content such as text, image, etc.) in document pages 108 (e.g., a document page 110) of a document 112 relative to viewing of the document page 108 in a viewport 114. The placeholder content 104 is a structural representation of the content 106. In other words, the placeholder content 104 retains the same structural characteristics of the content 106.

For example, if a first content 116 is a multi-sentence paragraph of text, the corresponding placeholder content 118 retains the same layout (structural) characteristics (silhouette) of the words and sentences, word-wrap, and line wrap location, and so on, in the rendered image. The rendering component 102 renders the placeholder content 104 according to the structural characteristics of the content 106.

It can be the case that the image is of a low resolution that the text is unreadable by the user; however, the general silhouette of the paragraph as defined by the sentences, word wrap, line wrap, and so on, enables the user to affirm that the placeholder content 118 is the same as the content 116 (fully rendered text). Such user recognition based on the layout and silhouette can then be utilized by the user to quickly examine the content 106 of the document 112 to navigate to the desired page or location. In another embodiment, the low resolution of the placeholder content 116 is such that the text in the placeholder image is still recognizable or readable by the user.

Note that although the document 112 is shown outside the viewport, the document 112 is typically accessed (or "opened") by a compatible application (not shown) thereby resulting in creation of the viewport 114 (user interface) as part of the application code. For example, when opening a word processing document, the viewport 114 enables not only viewing of the document pages 108, but also navigation capabilities such as scrolling up or down the pages 108, page-up, page-down, jumping directly to a specific page by entering a page number, and so on.

The system 100 can further include a presentation component 120 that presents the placeholder content 118 in the document page 110 for viewing, in place of the first content 116, in response to untimely (not according to a predetermined time in the range of, e.g., milliseconds) presentation of the content 116 in the document page 110 for viewing. The "untimeliness" can also be based on whether the content 116 is ready for viewing in the document page 110 via the viewport 114 when the user has navigated to that point. The placeholder content 118 is rendered to retain responsiveness of navigation over the document page 110 and other document pages (of the document pages 108) of an associated document 112.

In other words, if as the user scrolls through the document pages, the content of a given page halts the navigation process, the user experience can be negatively impacted if the time delay is significant (e.g., seconds, tens of seconds, etc.). Thus, the generation of the placeholder content 104 is designed to be sufficiently quick to not impede the user navigation and hence, impact the user experience. The document page 110 also show second content 122 that was presented in time for viewing in the viewport 114 or had already been placed into the document page 110 prior to entering the viewport 114 based on replacement of its associated placeholder content.

The placeholder content 118 can be of a lower resolution (an image) than the content 116, which is full resolution content such as text. The placeholder content 118 is of an equivalent dimensional footprint of the content 116. The placeholder content 118 is a scaled down version of the content 116, the placeholder content 118 is expanded to match the dimensional footprint of the content 116 for viewing via the viewport 114 in the document page 110.

The presentation component 120 presents a visual transition (e.g., abrupt replacement, phasing by special effects, etc.) from the placeholder content 118 to the content 116 in the document page based on timely rendering of the content 116 while viewing the document page 110 in the viewport 114. The rendering component 102 can pre-render the placeholder content 104 in anticipation of navigation over the document page 110 and other document pages (of the pages 108) and based on the untimely presentation of the content 116, and stores the pre-rendered placeholder content 104. The rendering component 102 can store the placeholder content 104 at a lower resolution to allow resources (e.g., memory, cache, etc.) to become available for other purposes (e.g., background processing).

Figure 2:
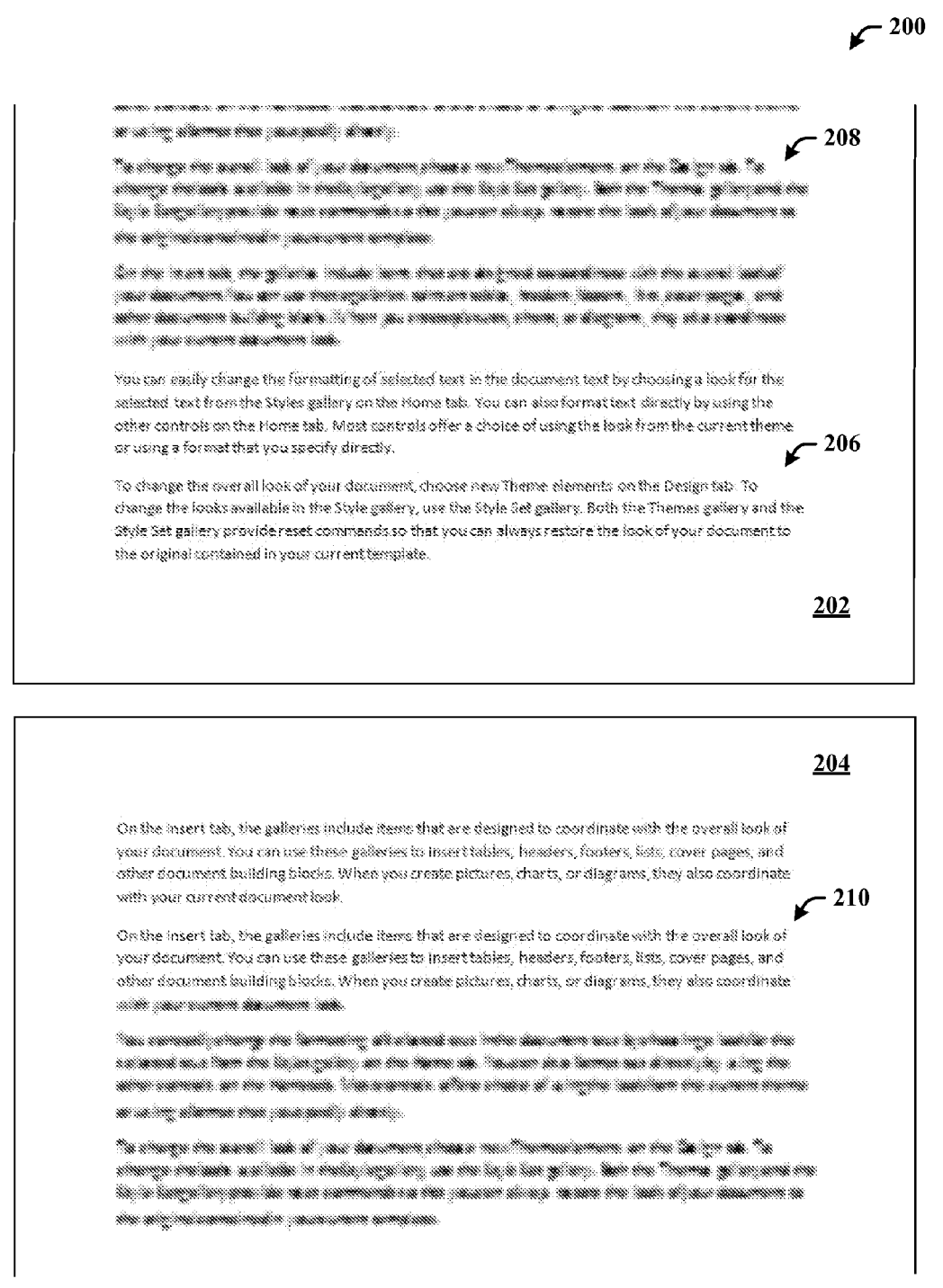

FIG. 2 illustrates a view 200 of low resolution placeholder content merged with full resolution content in a text document of multiple pages. The view 200 in the viewport shows two partial pages: a top page 202 and a bottom page 204. In the top page 202, fully rendered text 206 (e.g., the content 116) is rendered as placeholder content 208 (e.g., placeholder content 118). Although repeated in the same partial document 202, the intent is only to show one implementation of the disclosed architecture for a word processing application, and a comparison between the text content 206 and its associated text image placeholder content 208.

Notice that the structural similarities between the text content 206 and its associated placeholder content 208 in that although the placeholder text may not be easily readable, the overall silhouette (or outline) is similar, as well as the line lengths, paragraph size, sentence endpoints, and so on.

It can be the case that the placeholder content is rendered on a line-by-line basis such that transitioning from the placeholder content to the content appears as a single line phasing into view and recognition from the blurred form of the placeholder. This can be the case on the bottom page 204 where the second paragraph 210 is transitioning into full content view one line at a time (the last line is still blurred prior to its transitioning). It is also within contemplation of the disclosed architecture that low resolution rendering can be by paragraph, or multiple paragraphs, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
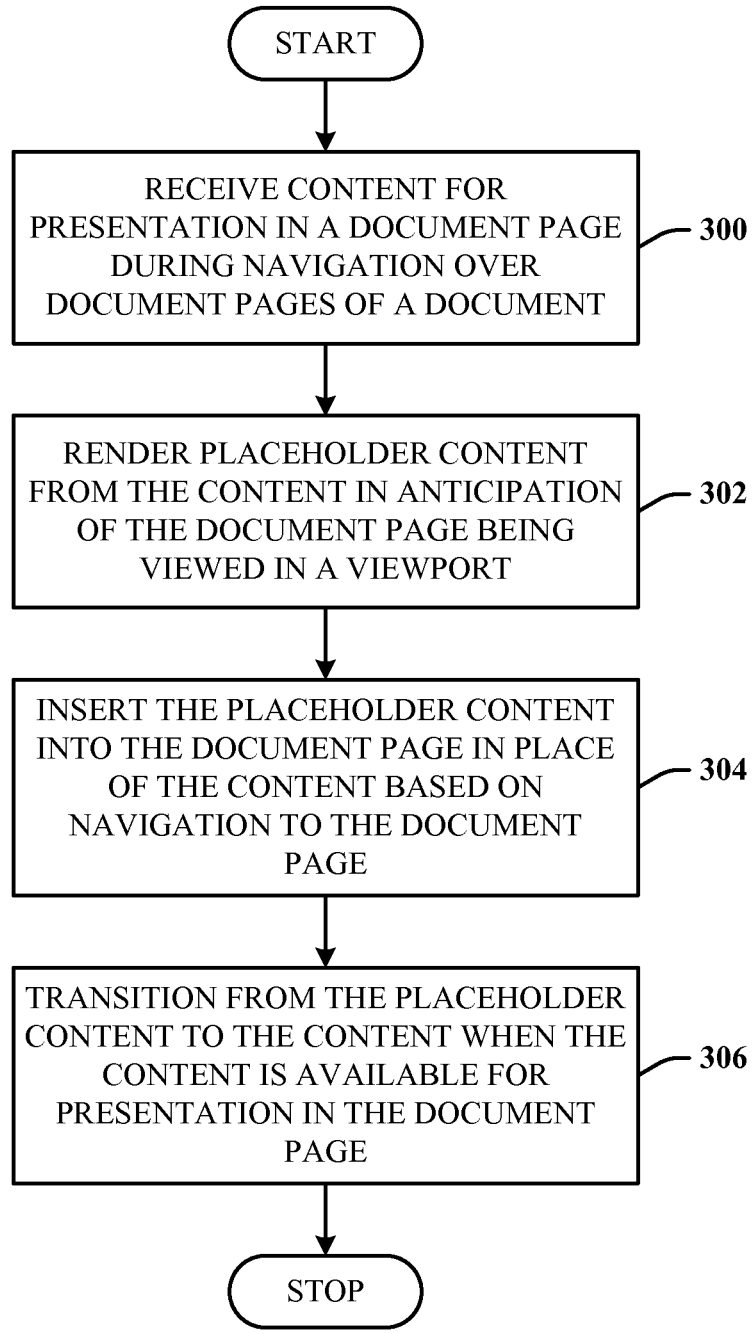
FIG. 3 illustrates a method in accordance with the disclosed architecture.

FIG. 3 illustrates a method in accordance with the disclosed architecture. At 300, content is received for presentation in a document page during navigation over document pages of a document. The document page can be one page of multiple pages to be navigated (e.g., scrolled, page-up, page-down, etc.) by the user when in the association application (e.g., a word processor). At 302, placeholder content is rendered from the content in anticipation of the document page being viewed in a viewport. The viewport is the interface by which the user sees the document page or portion thereof having the content. The viewport can be an application window, for example. The rendering component generates a bitmap image of the content, at a much lower resolution (e.g., a tenth) than the actual or full resolution at which the content (e.g., text) will be finally presented in the document page.

Additionally, the anticipation is determined by the direction of navigation, for example, scrolling. If the user is scrolling down a multi-page document to or past previously unopened pages, the architecture can determine that navigation is likely to continue proceed in the same direction, thereby rendering placeholder content from content before the pages reach the viewport (a pre-rendering process). Previously opened pages would already have placeholder content and fully rendered content, and thus, these files can be cached for re-presentation if the user changes the direction of navigation back to the corresponding document page. If sufficient time has passed, a previously viewed page can have all fully rendered content. Alternatively, if the user scrolls quickly past a page with some placeholder content and fully rendered content, the architecture can determine to stop replacement of the placeholder content in the previous page, and re-focus resources in the "direction" (upcoming pages) the user is navigating. Background processing can then be employed to perform "catch-up" replacement of placeholder content when the application is idle (not performing other necessary function or operations).

In one implementation, the forward and backward replacement of placeholder content can be configured to not exceed a predetermined number of pages, for example. It can be advantageous to enable the application to "work ahead" a predefined number of pages, yet not get too far ahead in rendering and replacement that the resources consumed effect system performance, and hence, the user experience. For example, in a 100-page document, the system can be configured to only work ahead ten pages. If the user immediately navigates ahead (jumps) to page fifty, the system can then be configured to not only work no more than ten pages ahead, but to limit backward rendering and replacement to only five pages. If the user changes direction in navigation, the forward and backward criteria then apply in the new direction.

In another implementation, the configuration can be according to a distance, rather than the number of pages. In web browsers (and in a word processor web view, for example), a view can be obtained that is a single very large page. The disclosed architecture can still apply; however, the pre-rendering is not the entire page, but only a portion thereof.

These are just a few examples of how the architecture can be made performant to provide a good user experience. Other criteria can be based on a user profile, manual settings by the user, automated learning of user behavior and interactions when in the document, the type of content of interest to the user at a given time, hardware capabilities of the current system, type of application, if the document is a local document or a network-based document such that bitmap images (placeholder content) are moved from the remote network to the client machine, and so on.

At 304, the placeholder content is inserted into the document page in place of the content based on navigation to the document page. The placeholder content is inserted into the same structural dimensions allocated for the content. Thus, if the final (actual) content structural dimension is six inches long and three inches in width, and fits into a standard letter size document page with one and a half inch left margin and one inch right margin, the placeholder content is processed (e.g., stretched) to fit into the final (actual) content structural dimension until such time as the content is ready to be presented in the same location. The placeholder content can have more processing applied, other than or in addition to, stretch. For example, blurring, dimming, are some effects than can be employed to indicate the content is placeholder content. At 306, the placeholder content is transitioned to the content when the content is available for presentation in the document page. The transition process includes, but is not limited to, effects such as cross-fade, vertical swipe, animation techniques, and other pattern transition examples.

Figure 4:
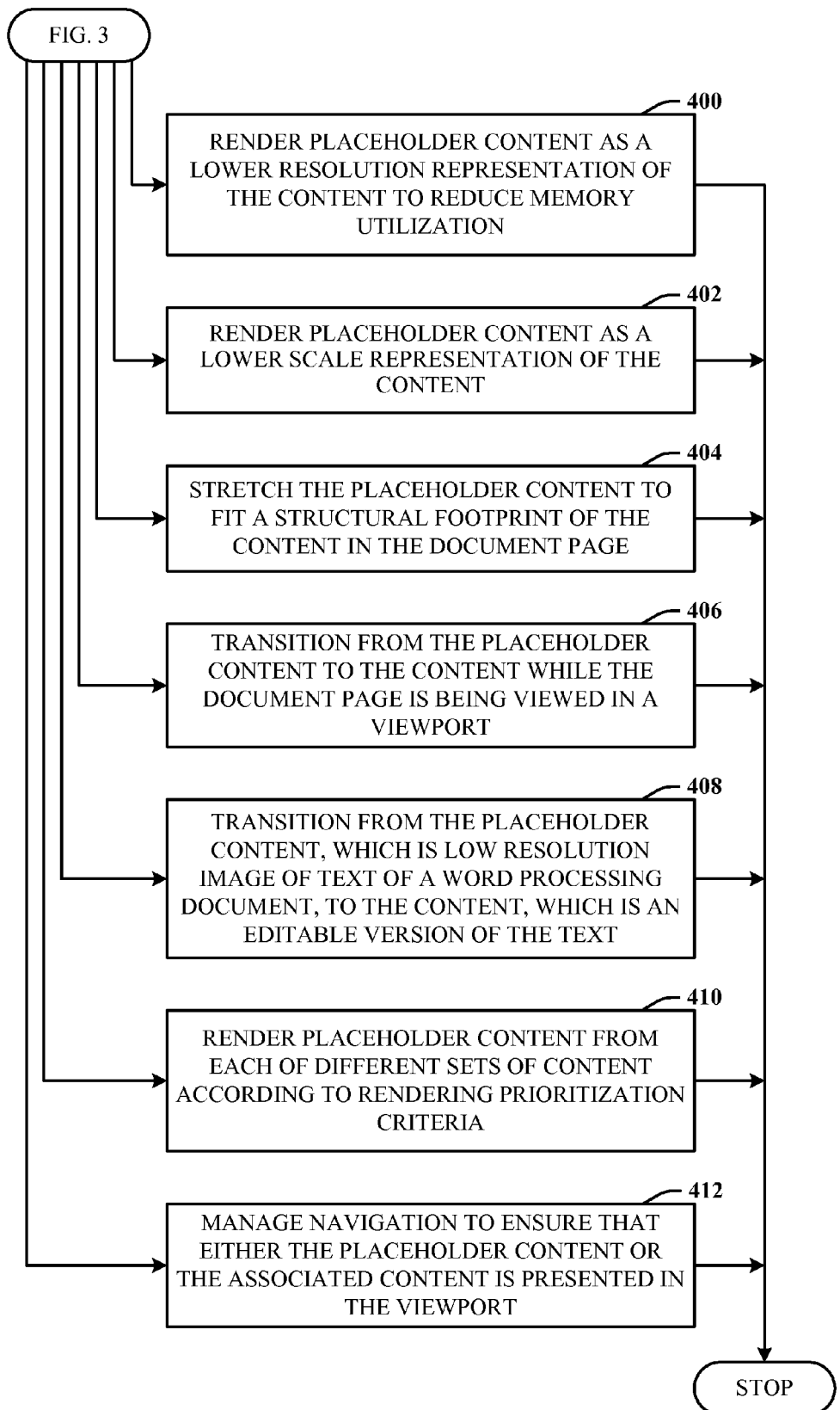
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the placeholder content is rendered as a lower resolution representation of the content to reduce memory utilization. Since the lower resolution file is smaller in size, the memory footprint of the file is smaller as well, leaving memory for other purposes. At 402, the placeholder content is rendered as a lower scale representation (e.g., image) of the content. The scale can be much reduced as well, thereby reducing the memory footprint of the placeholder file. The representation mimics the overall characteristics of the content. For example, if the content is a text paragraph, the representation may show blurred representations of the characters, words, line breaks, line ends, sentence indentation, etc., any or all of which may be recognized by the user to some extent.

At 404, the placeholder content is stretched to fit a structural footprint of the content in the document page. At 406, the placeholder content is transitioned to the content while the document page is being viewed in a viewport. Thus, while the user is viewing or reading fully presented text, as well as blurred (e.g., lower resolution) placeholder text, portions of the placeholder paragraph may be transitioned (from image to text) such that the user can recognize (e.g., read) the text. At 408, the placeholder content, which is low resolution image of text of a word processing document, is transitioned to the content, which is an editable version of the text.

In a more robust implementation, the architecture can consider criteria that when processed determines which of the placeholder content to render before other placeholder content. Since the content can be different types of media (e.g., text, image, audio, video, etc.), it may be determined that the user prefers to view all images before text, as a quick way to readily get to a desired point in the multi-page document. Moreover, it can be the case that a low resolution placeholder file of an image is more easily recognizable by the user than a low resolution version of placeholder content that is text. Thus, as the user scrolls down a set of pages, the images are rendered and presented before the text. Accordingly, at 410, placeholder content is rendered from each of different sets of content according to rendering prioritization criteria.

In one implementation, it can also be configured that navigation will not be allowed to proceed from one page to another page until one or more of the placeholder content or the content is presented on the page. The user will then be assured of viewing some version of the content in the viewport. Accordingly, at 412, navigation is managed to ensure that either the placeholder content or the associated content is presented in the viewport.

Figure 5:
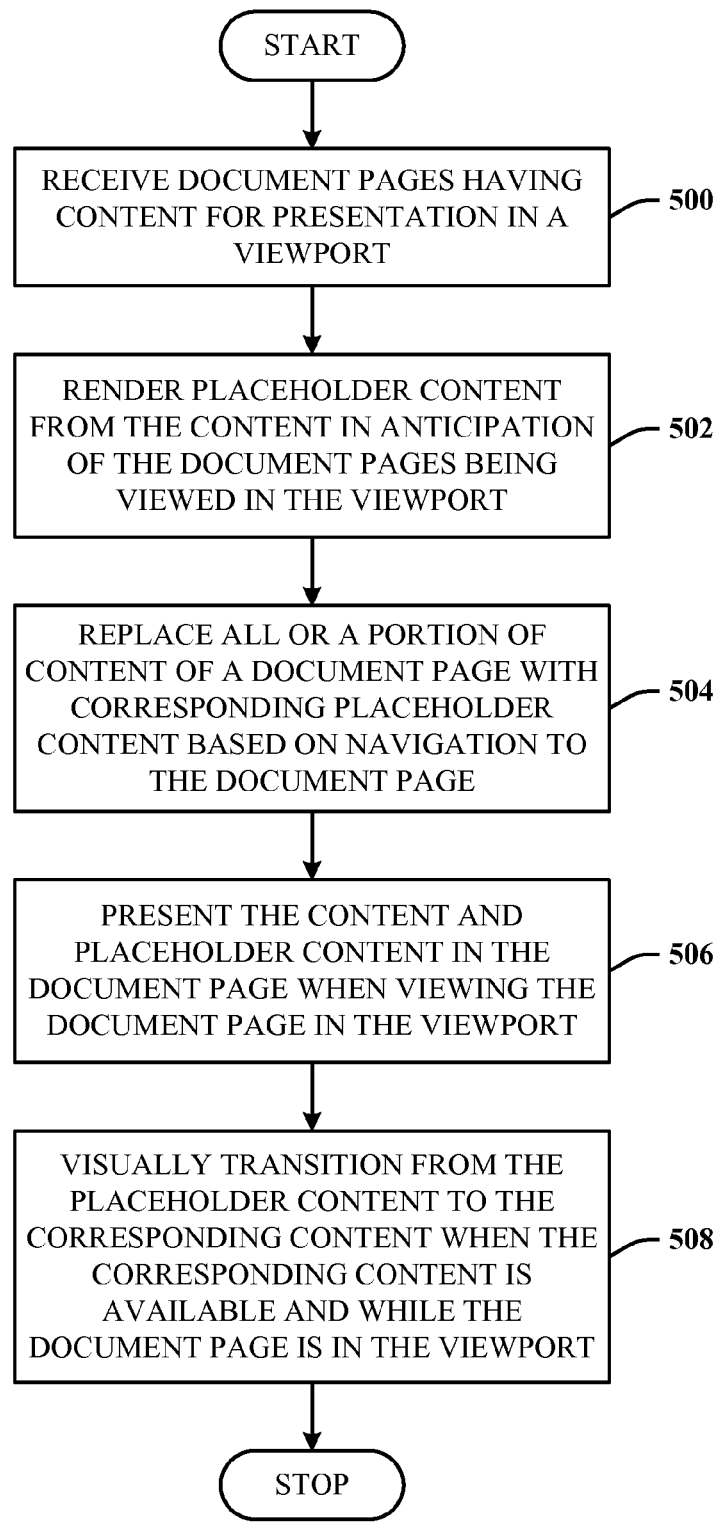
FIG. 5 illustrates an alternative method in accordance with the disclosed architecture.

FIG. 5 illustrates an alternative method in accordance with the disclosed architecture. At 500, document pages are received having content for presentation in a viewport. The user opens a multi-page document (e.g., word processing document) in an application (word processing) program. At 502, placeholder content is rendered (e.g., as a bitmap) from the content in anticipation of the document pages being viewed in the viewport. At 504, all or a portion of content of a document page is replaced with corresponding placeholder content based on navigation to the document page. This can depend on how long the user dwells on the page. If navigation is quick, the dwell is small, so replacement need not be extensive or complete for all content on the page. At 506, the content and placeholder content is presented in the document page when viewing the document page in the viewport. The placeholder content can be replaced while the user is viewing the document page or before the page reaches the viewport. At 508, the placeholder content is visually transitioned to the corresponding content (fully rendered non-imaged) when the corresponding content is available and while the document page is in the viewport.

Figure 6:
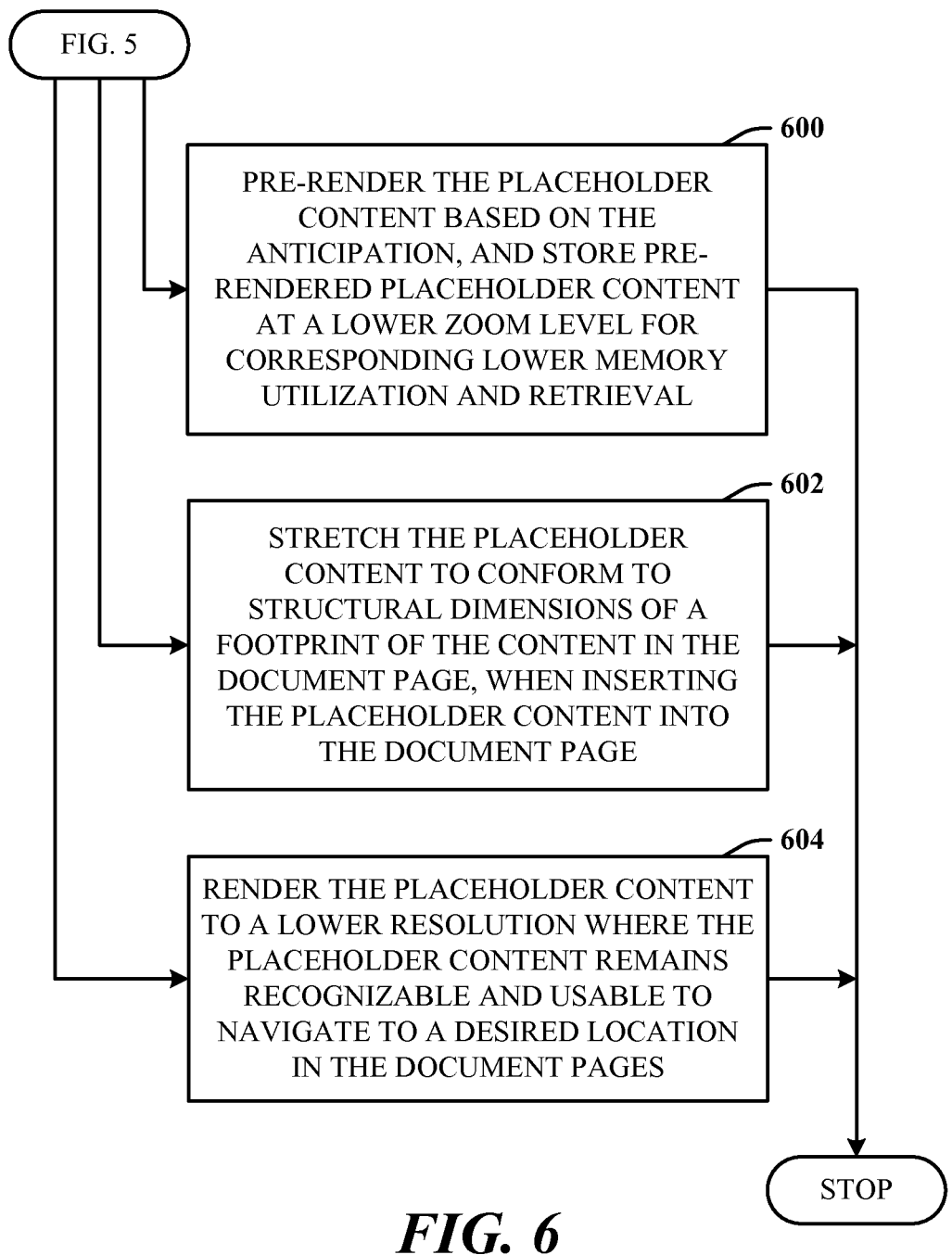
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the placeholder content is pre-rendered based on the anticipation. The pre-rendered placeholder content is stored at a lower zoom level for corresponding lower memory utilization and retrieval. This not only enables a smaller storage footprint, but also requires less chip memory for caching content and/or pages. At 602, the placeholder content is stretched to conform to structural dimensions of a footprint of the content in the document page, when inserting the placeholder content into the document page. The stretching is essentially taking the smatter image (placeholder content) and increasing its visual size to entirely consume the real estate of the content that will be eventually presented. At 604, the placeholder content is rendered to a lower resolution where the placeholder content remains recognizable and usable to navigate to a desired location in the document pages. In one implementation, the placeholder content is blurred due to the lower resolution image being expanded (stretched) to fit into the content physical space. It can be the case where the rendering is such that the placeholder text is still recognizable (readable) to the user. However, this is a performance and/or user experience consideration for the given implementation or environment.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
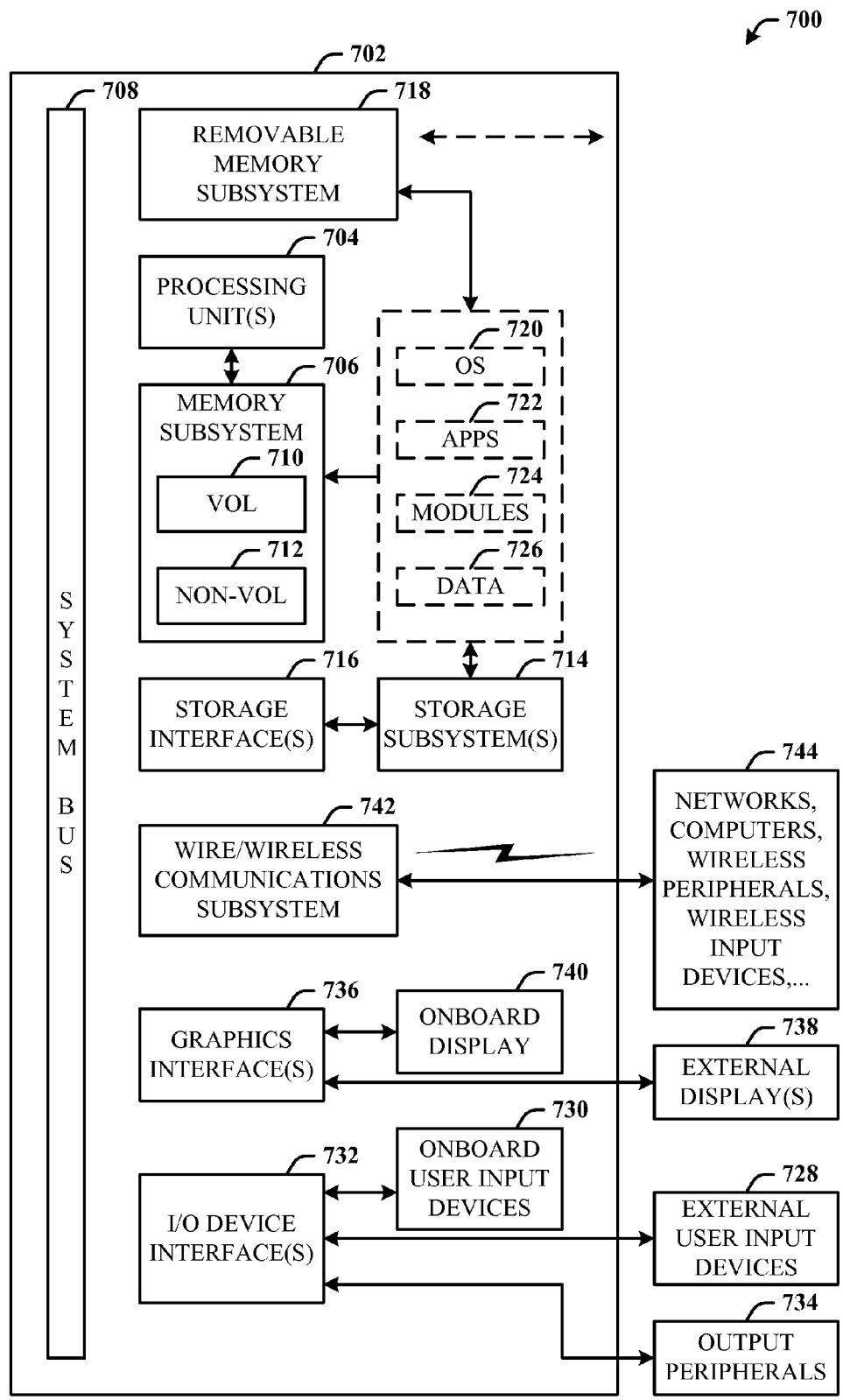
FIG. 7 illustrates a block diagram of a computing system that executes content placeholder processing in accordance with the disclosed architecture.

Referring now to FIG. 7, there is illustrated a block diagram of a computing system 700 that executes content placeholder processing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components for facilitating the view 200 of FIG. 2, and the methods represented by the flowcharts of FIGS. 3-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a computing device having a processor, comprising:
   with the processor,
      receiving content of a document for presentation in a plurality of document pages;
      determining if rendering a portion of the received content at a full resolution is timely for presentation in one of the document pages via a viewport when the one of the document pages is navigated to;
      in response to determining that rendering the portion of the received content at the full resolution is not timely,
         rendering the portion of the received content as a placeholder content at a lower resolution than the full resolution of the portion of the received content;
      inserting the rendered placeholder content into the one of the document pages in place of the portion of the received content;
      displaying the one of the document pages with the inserted placeholder content when the one of the document pages is navigated to while continuing rendering the portion of the received content at the full resolution;
      transitioning from the placeholder content to the portion of the received content at the full resolution in the displayed one of the document pages when rendering of the portion of the received content at the full resolution is completed;

determining that another page of the document is navigated to based on a direction of navigation of the document;

in response to the determination, rendering another portion of the received content corresponding to the another page of the document as another placeholder image, the another placeholder image being at a lower resolution than the full resolution of the received content; and utilizing a processor that executes instructions stored in memory to perform at least one of the acts of receiving, determining, generating, inserting, displaying, or transitioning.

2. The method of claim 1, further comprising stretching the placeholder content to fit a structural footprint of the portion of the received content in the displayed one of the document pages.

3. The method of claim 1, further comprising transitioning from the placeholder content to the rendered full resolution image of the portion of the received content while the displayed one of the document pages is being viewed in the viewport.

4. The method of claim 1 wherein the placeholder content is an image of text of a word processing document, and wherein transitioning includes transitioning to an editable version of the text.

5. The method of claim 1, further comprising rendering placeholder content from each of different sets of received content according to rendering prioritization criteria.

6. The method of claim 1, further comprising managing navigation to ensure that either the placeholder content or the corresponding portion of received content is presented in the viewport.

7. A method performed by a computing device having a processor, comprising:

with the processor, receiving content of a document for presentation in a plurality of document pages via a viewport;

determining if rendering at an actual resolution a portion of the received content is timely for viewing via the viewport in one of the document pages when the one of the document pages is navigated to;

in response to determining that rendering at the actual resolution of the portion of the received content would not be timely, rendering the portion of the received content as placeholder content at a lower resolution than the actual resolution and having a layout generally similar to that of the portion of the received content;

replacing the portion of the received content in the one of the document pages with the rendered placeholder content;

presenting another portion of the received content at the actual resolution and the placeholder content at the lower resolution in the one of the document pages when the one of the document pages is viewed in the viewport while continue rendering the portion of the received content at the actual resolution;

visually transitioning from the placeholder content to the corresponding rendered portion of the received content at the actual resolution when rendering of the corresponding portion of the received content is completed and while the one of the document pages is viewed in the viewport;

determining that another page of the document is navigated to based on a direction of navigation of the document;

in response to the determination, rendering another portion of the received content corresponding to the another page of the document as another placeholder image, the another placeholder image being at a lower resolution than the full resolution of the received content; and utilizing a processor that executes instructions stored in memory to perform at least one of the acts of receiving, rendering, replacing, presenting, or transitioning.

8. The method of claim 7, further comprising pre-rendering the placeholder content based on anticipation, and storing the pre-rendered placeholder content at a lower zoom level than a zoom level of the corresponding portion of the received content.

9. The method of claim 7, further comprising stretching the placeholder content to conform to structural dimensions of a footprint of the portion of the received content in the one of the document pages, when inserting the placeholder content into the one of the document pages.

10. The method of claim 7, further comprising rendering the placeholder content to a lower resolution unrecognizable to a user but usable to facilitate navigation by the user to a target location in the document pages.

11. A computing system, comprising:

a processor;

a display and a memory operatively coupled to the processor, the memory containing instructions that when executed by the processor cause the processor to perform a process including:

receiving a document for presentation, the document having a plurality of pages;

presenting the received document via the display, wherein the presenting includes:

determining if rendering of a portion of the received content at a full resolution is timely for presentation in one of the pages of the document via the display when the page is navigated to;

in response to determining that rendering the portion of the received content at the full resolution is not timely, rendering the portion of the received content as a placeholder image of the portion of the received content, the placeholder image being at a lower resolution than the full resolution of the received content;

inserting the rendered placeholder image into the page in place of the portion of the received content at the full resolution;

displaying the page with the inserted placeholder image via the display while rendering the portion of the received content at the full resolution; and transitioning from the placeholder image to the portion of the received content at the full resolution after rendering of the portion of the received content at the full resolution is completed;

determining that another page of the document is navigated to based on a direction of navigation of the document; and in response to the determination, rendering another portion of the received content corresponding to the another page of the document as another placeholder image of the portion of the received content, the another placeholder image being at a lower resolution than the full resolution of the received content.

12. The computing system of claim 11 wherein:
the portion of the received content includes text; and
rendering the portion of the received content as the placeholder image includes rendering the portion of the received content as a bitmap image of the text.

13. The computing system of claim 11 wherein:
the page is a first page of the document;
the another page is a second page; and
the process performed by the processor further includes:
   in response to the determination that another page of the document is navigated to,
      stopping rendering the portion of the received content corresponding to the first page at the full resolution.

14. The computing system of claim 11 wherein:
the page is a first page of the document;
the another page is a second page; and
the process performed by the processor further includes:
   in response to the determination that another page of the document is navigated to,
      inserting the rendered another placeholder image into the second page of the document in place of the another portion of the received content at the full resolution; and
      continuing rendering the portion of the received content corresponding to the first page at the full resolution.

15. The computing system of claim 11 wherein:
the page is a first page of the document;
the another page is a second page, the second page being within a predetermined number of pages from the first page; and
the process performed by the processor further includes:
   inserting the rendered another placeholder image into the second page of the document in place of the another portion of the received content at the full resolution; and
   stopping rendering the portion of the received content corresponding to the first page at the full resolution.

16. The computing system of claim 11 wherein:
the portion of the received content is a first portion associated with the page of the document;
the received content includes a second portion associated with the page of the document, the second portion having a different content type than the first portion; and
presenting the received document further includes:
   determining if rendering of the second portion of the received content at the full resolution is timely for presentation in one of the pages of the document via the display when the page is navigated to;
   in response to determining that rendering the second portion of the received content at the full resolution is not timely,
      rendering the second portion of the received content as a placeholder image of the second portion of the received content, the placeholder image being at a lower resolution than the full resolution of the received content;
      inserting the rendered placeholder image into the page in place of the second portion of the received content at the full resolution;
      displaying the page with the inserted placeholder image via the display while rendering the second portion of the received content at the full resolution; and
      transitioning from the placeholder image to the second portion of the received content at the full resolution after rendering of the second portion of the received content at the full resolution is completed.

17. The computing system of claim 11 wherein:
the portion of the received content is a first portion associated with the page of the document;
the received content includes a second portion associated with the page of the document, the second portion having a different content type than the first portion; and
presenting the received document further includes:
   determining if rendering of the first and second portions of the received content at the full resolution is timely for presentation in one of the pages of the document via the display when the page is navigated to; and
   in response to determining that rendering the first and second portions of the received content at the full resolution is not timely, preferentially performing the rendering, inserting, displaying, and transitioning operations based on the content type of the first and second portions of the received content.

18. The computing system of claim 11 wherein:
the portion of the received content is a first portion associated with the page of the document, the first portion containing text content;
the received content includes a second portion associated with the page of the document, the second portion containing image content; and
presenting the received document further includes:
   determining if rendering of the first and second portions of the received content at the full resolution is timely for presentation in one of the pages of the document via the display when the page is navigated to; and
   in response to determining that rendering the first and second portions of the received content at the full resolution is not timely, preferentially performing the rendering, inserting, displaying, and transitioning operations on the second portion of the received content over the first portion of the received content.

19. The computing system of claim 11 wherein the process performed by the processor further includes preventing navigation away from the page of the document until at least one of the placement image or the portion of the received content at the full resolution is presented on the display.

20. The computing system of claim 11 wherein rendering the portion of the received content as the placeholder image includes stretching the placeholder content to fit a structural footprint of the portion of the received content in the displayed one of the document pages.

* * * * *